(12) United States Patent
May

(10) Patent No.: US 6,362,605 B1
(45) Date of Patent: Mar. 26, 2002

(54) METHOD AND APPARATUS FOR PROVIDING POWER TO AN INTEGRATED CIRCUIT

(75) Inventor: Michael R May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 09/645,722

(22) Filed: Aug. 24, 2000

(51) Int. Cl.[7] .............................. G05F 1/56; H03K 3/45
(52) U.S. Cl. ...................................... 323/265; 330/255
(58) Field of Search ................................. 323/265, 266, 323/279; 307/296.2, 296.8, 297; 327/536, 537, 108, 548; 330/253, 261, 255, 259, 270, 265

(56) References Cited

U.S. PATENT DOCUMENTS

| 5,045,717 A | | 9/1991 | Moen, Jr. et al. | |
|---|---|---|---|---|
| 5,113,088 A | * | 5/1992 | Yamamoto et al. | 307/296.2 |
| 5,381,113 A | * | 1/1995 | Kimura | 330/253 |
| 5,642,078 A | * | 6/1997 | Navabi et al. | 330/136 |
| 5,696,459 A | * | 12/1997 | Neugebauer et al. | 327/108 |
| 5,907,263 A | | 5/1999 | Divine et al. | |
| 5,909,152 A | | 6/1999 | Li et al. | |
| 5,999,062 A | | 12/1999 | Gilbert | |

OTHER PUBLICATIONS

Michael R. May, Method and Apparatus for Providing Power to an Integrated Circuit, No date.

* cited by examiner

Primary Examiner—Rajnikant B. Patel
(74) Attorney, Agent, or Firm—Timothy W. Markison

(57) ABSTRACT

A method and apparatus for efficiently powering an integrated circuit include processing that begins by generating a representation of a battery voltage. The processing then continues by producing a regulated bias current based on the representation of the battery voltage. The processing continues by providing the regulated bias current to an external crystal, which, in turn, generates an oscillation in response to the bias current. The processing then continues by generating a clock signal from the oscillation produced by the external crystal. The clock signal is then provided to a DC-to-DC converter that converts the battery voltage into a regulated output voltage.

17 Claims, 4 Drawing Sheets

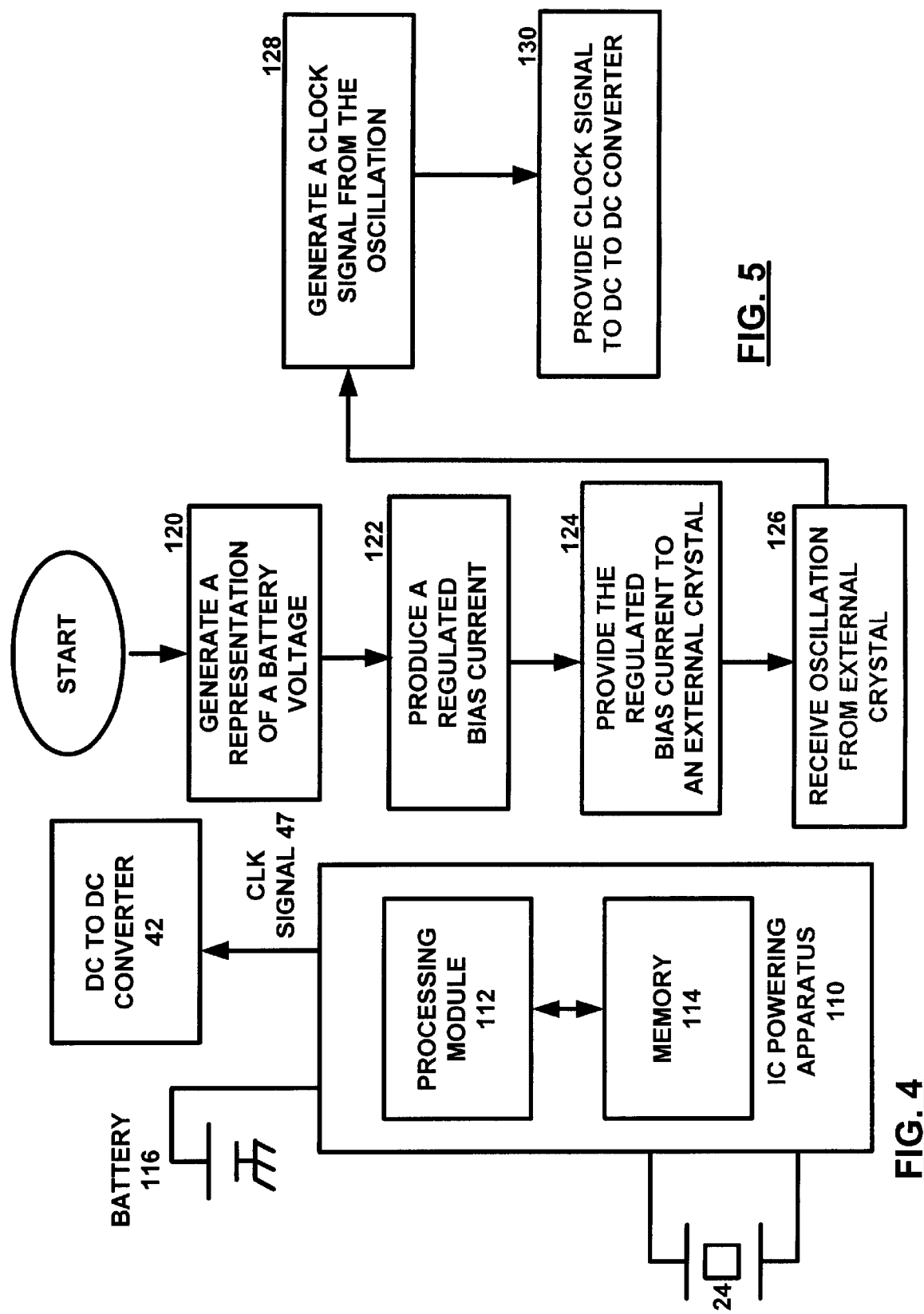

METHOD AND APPARATUS FOR PROVIDING POWER TO AN INTEGRATED CIRCUIT

TECHNICAL FIELD OF THE INVENTION

This invention relates generally to integrated circuits and more particularly to powering such integrated circuits.

BACKGROUND OF THE INVENTION

As is known, batteries power a multitude of portable electronic devices. To extend battery life, most portable electronic devices incorporate technologies to conserve power consumption. For example, portable radios, CD players, DVD players, cellular phones, etc. all include integrated circuits that process data to achieve a desired output response and consume power whether they are processing data or not. To conserve power consumption by such integrated circuits, power conservation techniques are used.

Such power conservation techniques include disabling circuitry of the integrated circuit when the circuitry is not in use. For example, if a cellular phone is in standby mode, i.e. not participating in a telephone conversation, only the circuitry that detects an incoming or outgoing call needs to be active. Thus, other circuitry within the cellular telephone, e.g., the audio processing circuitry, may be disabled, i.e. in a sleep mode, to conserve power. When the circuitry is needed to process data the corresponding circuitry is enabled, i.e. awakened, to perform the desired function(s). As is known, enabling and disabling the clock signal provided to the circuitry is a typical way to disable and enable circuitry within an integrated circuit. To enable and disable circuitry within a portable electronic device, there is an interdependency between the enabling and disabling of components within a portable electronic device. This is illustrated with reference to FIG. 1.

FIG. 1 illustrates a schematic block diagram of a portable electronic device 10 that includes a power source 12, an on off switch 14, a discrete power supply 16, an integrated circuit 17, an inverter 26 and a crystal 24. In operation, the power source 12, which may be a battery or a plurality of batteries, provides energy to the discrete power supply 16 when the on/off switch 14 is enabled. Note that the discrete power supply 16 is a separate physical device from integrated circuit 17. In response to receiving power from the power source, the discrete power supply 16 generates a supply voltage 22, which is provided to inverter 26 and the integrated circuit 17. The inverter 26 provides a current to crystal 24 such that the crystal 24 produces an oscillation. The oscillation is provided to a clock generator 18 within the integrated circuit to produce a clock signal. The clock signal is provided to digital circuitry 20 within the integrated circuit 17 such that the digital circuitry 20 may perform its intended functions.

To minimize power consumption within the portable electronic device 10, the inverter 26 is sized based on the supply voltage 22 to provide a minimal controlled bias current to the crystal 24. By providing a minimal bias current a minimal amount of energy needed to produce an oscillation from crystal 24 is utilized. This approach works well when a regulated supply voltage 22 powers the inverter 26.

If the discrete power supply 16 were integrated into the integrated circuit 17 and needed a clock signal to produce the supply voltage 22, the above-described bias current circuit would not be efficient since a regulated supply voltage 22 would not initially be available. To initially generate the bias current, a battery would provide energy to the inverter 26 to produce an initial bias current. However, once the power supply 16 is up and running, supply voltage 22 provides energy to the inverter 26 to produce the same bias current. In this instance, additional power will be consumed to produce the same bias current since the supply voltage 22 is typically several times greater in value than the battery voltage and power consumption increases when the source voltage increases.

Therefore, a need exists for a method and apparatus that efficiently powers an integrated system contained on an integrated circuit.

BRIEF DESCRIPTION OF THE DRAWINGS

FIG. 4 illustrates a schematic block diagram of an integrated circuit powering apparatus in accordance with the present invention; and FIG. 5 illustrates a logic diagram of a method for powering an integrated circuit in accordance with the present invention.

DETAILED DESCRIPTION OF A PREFERRED EMBODIMENT

Generally, the present invention provides a method and apparatus for efficiently powering an integrated circuit. Such a method and apparatus include processing that begins by generating a representation of a battery voltage. The processing then continues by producing a regulated bias current based on the representation of the battery voltage. The processing continues by providing the regulated bias current to an external crystal, which, in turn, generates an oscillation in response to the bias current. The processing then continues by generating a clock signal from the oscillation produced by the external crystal. The clock signal is then provided to a DC-to-DC converter that converts the battery voltage into a regulated output voltage. With such a method and apparatus, power consumption to produce a crystal oscillator bias current is reduced and is therefore especially useful in portable electronic devices that include integrated systems on an integrated circuit.

Figure 2:
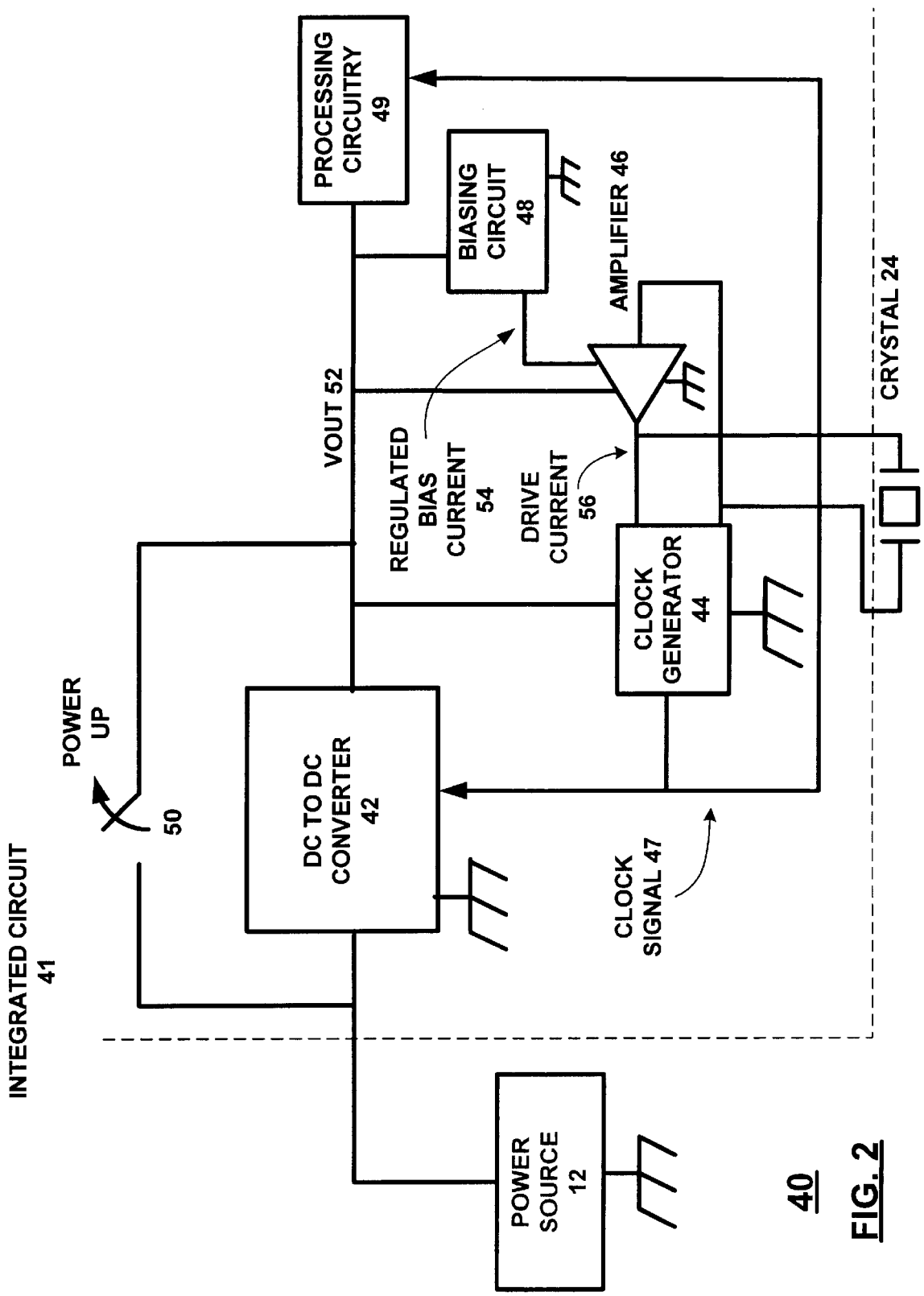
FIG. 2 illustrates a schematic block diagram of an integrated system for use in a portable electronic device in accordance with the present invention.

The present invention can be more fully described with reference to FIGS. 2 through 5. FIG. 2 illustrates a portable electronic device 40 that includes a power source 12, a crystal 24, and an integrated circuit 41. The integrated circuit 41 includes a DC-to-DC converter 42, a clock generator 44, amplifier 46, a biasing circuit 48, and processing circuitry 49. In this configuration, the DC-to-DC converter 42 requires a clock signal 47 before it can generate the output voltage 52. As such, a biasing current needs to be provided to crystal 24 such that clock generator 44 may produce clock signal 47 and the corresponding circuitry needs to be powered from the power source 12. Note that the power source 12 may be a battery, solar panel, or any discrete component that generates a voltage potential based on a chemical reaction, temperature differential, sunlight, etc.

At start up of the portable circuit 40, or awakening of the integrated circuit 41, switch 50 is closed such that the power source 12 provides power to the output voltage 52 node. The biasing circuit 48 senses the battery voltage via a connection and produces a bias current 54 therefrom. The bias current 54 drives amplifier 46 such that amplifier 46 may produce a drive current 56. The drive current 56 causes crystal 24 to produce an oscillation. Clock generator 44 receives the oscillation and produces, therefrom, a clock signal 47. By using clock signal 47, the DC-to-DC converter 42 produces a regulated supply voltage 52. Details of the DC-to-DC converter are contained in co-pending patent application entitled METHOD AND APPARATUS FOR REGULATING A DC OUTPUT VOLTAGE, assigned to the same assignee as the present invention, having a Ser. No. of 09/551,123, and a filing date of Apr. 18, 2000.

Once the DC-to-DC converter begins producing a regulated output voltage (Vout) 52, switch 50 opens and processing circuitry 49 is enabled to perform the desired function for the particular portable electronic device. For example, the processing circuitry 49 may include MP3 decoding and associated processing such that the portable device 40 is a MP3 player/recorder. Alternatively, or in addition to, the processing circuitry 49 may include processing for compression and decompression of audio signals for use in cellular telephones, CD players, DVD players, etc.

Figure 3:
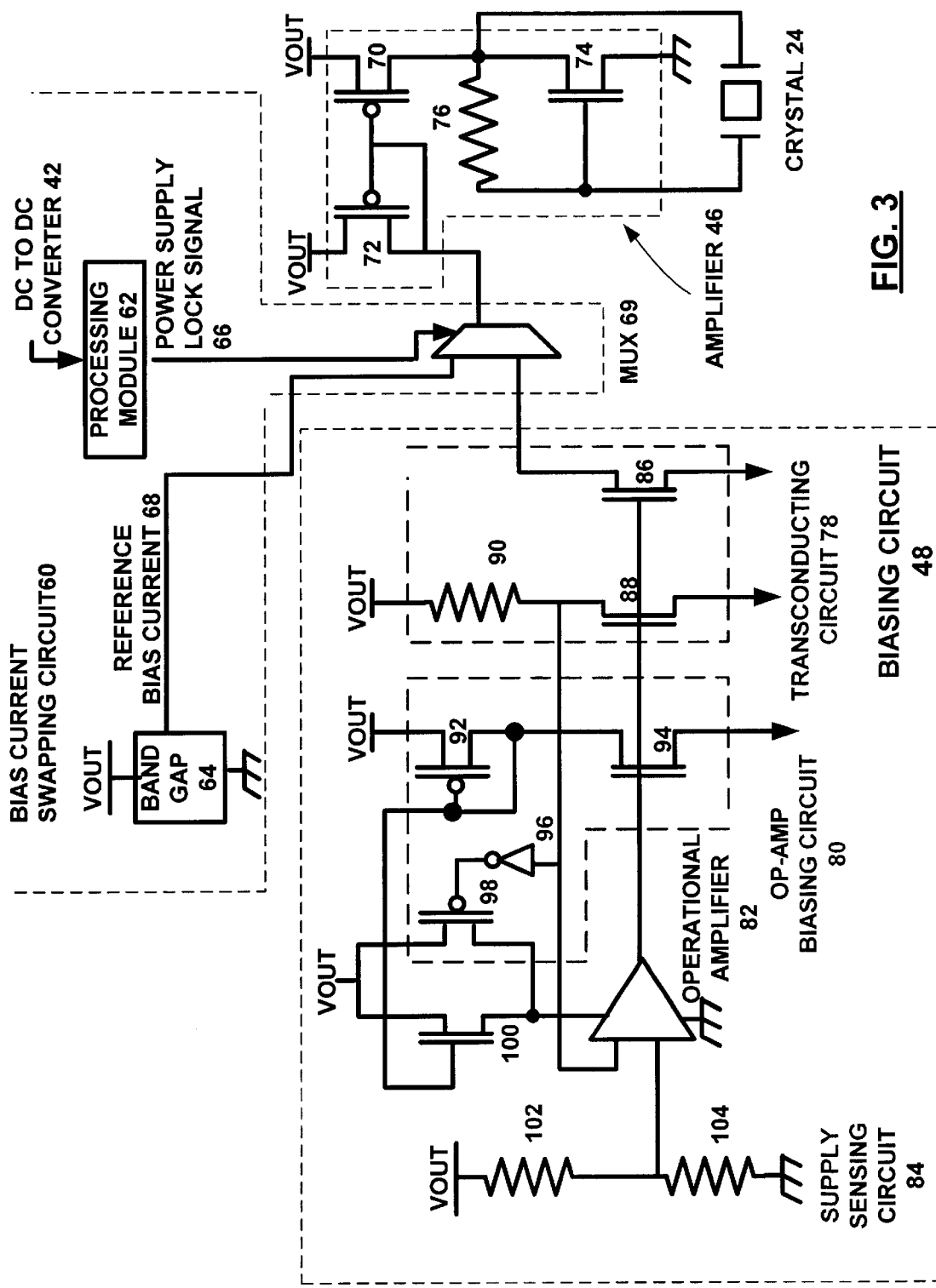
FIG. 3 illustrates a more detailed schematic diagram of portions of the integrated system of FIG. 2.

FIG. 3 illustrates a more detailed schematic block diagram of the biasing circuit 48, the amplifier 46, and further includes a bias current swapping circuit 60. The biasing circuit 48 includes a transconducting circuit 78, an operational amplifier 82, and a supply sensing circuit 84. The biasing circuit 48 may further include an operational amplifier biasing circuit 80. The transconducting circuit 78 includes transistors 86 and 88 and resistor 90. The supply sensing circuit 84 includes resistors 102 and 104. The operational amplifier is coupled to the output voltage supply 52 via transistor 100.

The operational amplifier biasing circuit 80 includes transistors 92, 94 and 98 and inverter 96. Inclusion of the operational amplifier biasing circuit 80 in the biasing circuit 48 is not essential, but is desirable to avoid potential lockup conditions. For example, the operational amplifier is coupled as a unity gain amplifier and, if at power up, transistor 88 of the transconducting circuit 78 does not receive enough energy to turn on, then transistor 100, which provides energy to the operational amplifier 82, will not turn on, thus the operational amplifier 82 will not turn on. If operational amplifier 82 will not turn on, transistor 88 of the transconducting circuit 78 cannot turn on. As such a lockup condition occurs.

The supply sensing circuit 84 senses the output supply voltage to produce a representation of the supply voltage. The magnitude of the representation is based on the sizing of resistors 102 and 104, which is dependent on the desired bias current and power consumption. For example, resistor 102 may be nine times the size of resistor 104 to produce a 10:1 voltage divider. As such, the supply sensing circuit 84 provides a $\frac{1}{10}^{th}$ representation of the supply voltage 52 to the operational amplifier 82. The operational amplifier 82 passes the $\frac{1}{10}^{th}$ representation to the transconducting circuit 78, which converts the representative voltage into a current via transistors 88 and 86 and resistor 90. If the integrated circuit does not include the bias current swapping current 60, the drain of transistor 86 is operably coupled to the amplifier 46.

Figure 1:
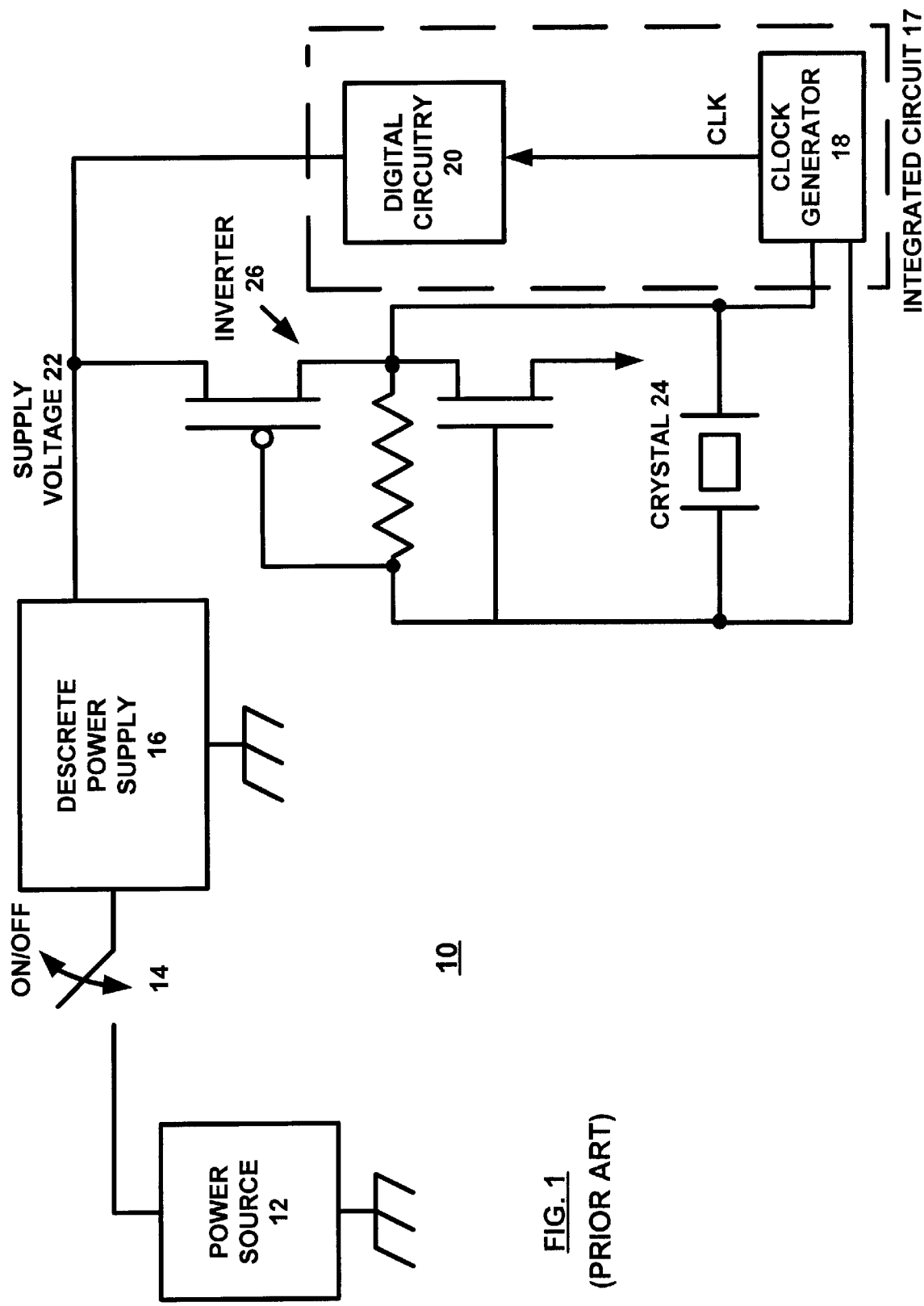
FIG. 1 illustrates a schematic block diagram of a prior art portable electronic device.

As shown, amplifier 46 includes transistors 70, 72 and 74 and resistor 76. Without the bias current swapping current 60, transistor 72 is operably coupled to transistor 86 of the transconducting circuit 78. As such, a reference current is established via transistor 72 and 86. The reference current is mirrored into transistors 70 and 74. As one of average skill in the art will appreciate, depending on the size of the transistors 70 and 72 and the relationship there between, the current mirrored in transistor 70 will be a multiple of the current through transistor 72 and is the bias current that is provided to crystal 24. In this configuration, the battery powers the biasing circuit 48 and amplifier 46 until the DC-to-DC converter is operational. Once the DC-to-DC converter is operational, it powers the biasing circuit 48 and amplifier 46. As such, when the power source switches from the battery to the DC-to-DC converter, the power consumed by the biasing circuit 48 and amplifier 46 will increase but only about half as much as the increase of power consumption of the circuit shown in FIG. 1.

To further reduce power consumption of the bias circuit 48, a bias current swapping circuit 60 may be incorporated into the integrated circuit. The bias current swapping circuit 60 includes a band gap reference 64, a processing module 62, and a multiplexor 69. Note that the processing module 62 may be the processing module included in digital circuitry 49 as shown in FIG. 2 or similar to the processing module 112 of FIG. 4. In either implementation, the processing module 62 senses when the DC-to-DC converter 42 is in a steady state condition, i.e. producing a stable output voltage 52. When this occurs, the processing module 62, software, or external processing device may generate a power supply lock signal 66. The power supply lock signal 66 controls the multiplexor 69 selection. When the power supply lock signal 66 is not enabled, the multiplexor 69 couples transistor 72 to transistor 86 of the transconducting circuit 78. When the power supply lock signal 66 is active, the multiplexor 69 couples transistors 72 to the band gap reference 64. As shown, the band gap reference 64 produces a reference bias current 68 which, may be sized using known techniques to substantially match the bias current produced by the biasing circuit 28 when it is powered by the battery. As such, there is a minimal difference between the power consumed before the DC-DC converter is operational and after it is operational to generate the bias current for the crystal 24.

FIG. 4 illustrates the schematic block diagram of an integrated circuit powering apparatus 110 that is coupled to a crystal 24, a battery 116, and the DC-to-DC converter 42. Note that the integrated circuit powering apparatus 110 and the DC-to-DC converter 42 may be contained on the same substrate of an integrated circuit. The integrated circuit powering apparatus 110 includes a processing module 112 and memory 114. The processing module 112 may be a single processing device or a plurality of processing devices. Such a processing device might by a microprocessor, microcontroller, microcomputer, digital signal processor, state machine, logic circuitry, analog circuitry, digital circuitry, and/or any device that manipulates signals (analog or digital) based on operational instructions. The memory 114 may be a single memory device or a plurality of memory devices. Such a memory device may be a read only memory, random access memory, flash memory, system memory, and or any device that stores digital information. Note that when the processing module 112 implements one or more of its functions via state machine, logic circuitry, analog circuitry and/or digital circuitry, the memory storing the corresponding operational instruction will be embedded in the circuitry comprising the state machine, logic circuitry, digital circuitry and/or analog circuitry. The operational instructions stored in memory 114 and executed by processing module 112 are illustrated in FIG. 5.

FIG. 5 illustrates a logic diagram of a method for powering an integrated circuit. The process begins at step 120 where a representation of a battery voltage is generated. The process then proceeds to step 122 where a regulated bias current is produced based on the representation of the battery voltage. The process then proceeds to step 124 where the regulated bias current is provided to an external crystal. The external crystal utilizes the regulated bias current to generate an oscillation.

The process then proceeds to step 126 where the oscillation is received from the external crystal. The process then proceeds to step 128 where a clock signal is generated from the oscillation. The process then proceeds to step 130 where the clock signal is provided to a DC-to-DC converter that converts the battery voltage into a regulated output voltage based on the clock signal. Note that once the DC-to-DC converter is providing a steady state output voltage, the regulated bias current may be replaced with a reference bias current.

The preceding discussion has presented a method and apparatus for powering an integrated circuit. When the integrated circuit includes a DC-to-DC converter, startup the integrated circuit and recovery from sleep mode present unique challenges. The present invention helps overcome the unique challenges to ensure that the integrated circuit is properly powered up using a minimal amount of power. As one of average skill in the art will appreciate, other embodiments may be derived from the teaching of the present invention without deviating from the scope of the claims.

What is claimed:

1. A biasing circuit for using in an integrated circuit, the biasing circuit comprising:
   an operational amplifier having a first input, a second input, and an amplifier output;
   supply sensing circuit operably coupled to provide a representation of a supply voltage to the first input; and
   a transconducting circuit operably coupled to the amplifier output and the second input, wherein the transconducting circuit and the operational amplifier produce, based on the representation of the supply voltage, a regulated bias current to start up at least a portion of the integrated circuit.

2. The biasing circuit of claim 1, wherein the transconducting circuit further comprises:
   a first transistor having a first gate, a first source, and a first drain, wherein the first gate is operably coupled to the amplifier output and the first source is coupled to a reference potential;
   a resistor operably coupled to the first drain and the supply voltage; and
   a second transistor having a second gate, a second source, and a second drain, wherein the second gate is operably coupled to the amplifier output and the second source is operably coupled to the reference potential, wherein the second drain provides the regulated bias current.

3. The biasing circuit of claim 2 further comprises:
   an amplifier operably coupled to amplify the regulated bias current to produce a drive bias current, wherein the amplifier provides the drive bias current to an external crystal.

4. The biasing circuit of claim 3, wherein the amplifier further comprises:
   a third transistor having a third gate, a third source, and a third drain, wherein the third drain and the third gate are coupled to the second drain and the third source is coupled to the supply voltage;
   a fourth transistor having a fourth gate, a fourth source, and a fourth drain, wherein the fourth gate is coupled to the third gate and the fourth source is coupled to the supply voltage;
   a fifth transistor having a fifth gate, a fifth source, and a fifth drain, wherein the fifth drain is coupled to the fourth drain, the fifth source is coupled to the reference potential, and the fifth gate is operably coupled to the fifth drain via a resistor, wherein the fifth gate and the fifth drain are operably coupled to the external crystal.

5. The biasing circuit of claim 1 further comprises:
   an operational amplifier biasing circuit operably coupled to provide a temporary bias current to the operational amplifier.

6. The biasing circuit of claim 1 further comprises:
   a current bias swapping circuit operably coupled to the transconducting circuit, wherein the current bias swapping circuit disables the transconducting circuit and provides a second regulated bias current when a power supply lock is detected.

7. An integrated power supply circuit comprises:
   a DC to DC converter;
   a clock generator operably coupled to provide a clock signal to the DC to DC converter, wherein the clock generator generates the clock signal based on an oscillation;
   a biasing circuit that includes:
      an operational amplifier having a first input, a second input, and an amplifier output;
      supply sensing circuit operably coupled to provide a representation of a supply voltage to the first input; and
      a transconducting circuit operably coupled to the amplifier output and the second input, wherein the transconducting circuit produces a regulated bias current based on the representation of the supply voltage; and
   amplifier operably coupled to receive the regulated bias current, wherein the amplifier drivers the external crystal to produce the oscillation.

8. The integrated power supply circuit of claim 7 further comprises a processing module operably coupled to process operational instructions to provide a power supply lock signal when the DC to DC converter has reached steady-state.

9. The integrated power supply circuit of claim 8 further comprises a current bias swapping circuit operably coupled to the transconducting circuit, wherein the current bias swapping circuit disables the transconducting circuit and provides a reference bias current when the power supply lock signal is detected.

10. The integrated power supply circuit of claim 9, wherein the current bias swapping circuit comprises:
    a band gap reference operably coupled to an output of the DC to DC converter to produce a reference bias current; and
    a multiplexor operably coupled to receive the reference bias current, the regulated bias current, and the power supply lock signal, wherein the multiplexor outputs the reference bias current when the power supply lock signal is active and outputs the regulated bias current when the power supply lock signal is not active.

11. The integrated power supply circuit of claim 7, wherein the biasing circuit further comprises an operational amplifier biasing circuit operably coupled to provide a temporary bias current to the operational amplifier.

12. A method for powering an integrated circuit, the method comprises ordered steps of:

generating a representation of a battery voltage;

producing a regulated bias current based on the representation of the battery voltage;

providing the regulated bias current to an external crystal, wherein the external crystal generates an oscillation in response to the bias current;

receiving the oscillation from the external crystal;

generating a clock signal from the oscillation;

providing the clock signal to a DC to DC converter that converts the battery voltage into a regulated output voltage based on the clock signal.

13. The method of claim 12, wherein providing the regulated bias current further comprises amplifying the regulated bias current.

14. The method of claim 12 further comprises replacing the regulated bias current with a reference bias current when a power supply lock signal is detected.

15. An apparatus for powering an integrated circuit comprises:

a processing module; and memory operably coupled to the processing module, wherein the memory stores operational instructions that cause the processing module to:

generate a representation of a battery voltage;

produce a regulated bias current based on the representation of the battery voltage;

provide the regulated bias current to an external crystal, wherein the external crystal generates an oscillation in response to the bias current;

receive the oscillation from the external crystal;

generate a clock signal from the oscillation;

provide the clock signal to a DC to DC converter that converts the battery voltage into a regulated output voltage based on the clock signal.

16. The apparatus of claim 15, wherein the memory further comprises operational instructions that cause the processing module to amplify the regulated bias current as part of providing the regulated bias current.

17. The apparatus of claim 15, wherein the memory further comprises operational instructions that cause the processing module to replace the regulated bias current with a reference bias current when a power supply lock signal is detected.

* * * * *